(12) United States Patent
Mamori

(10) Patent No.: US 6,317,454 B1
(45) Date of Patent: Nov. 13, 2001

(54) RAKE RECEIVER, AND MOBILE UNIT AND BASE STATION FOR PORTABLE TELEPHONE SYSTEM AND USING THE SAME

(75) Inventor: Yoshiki Mamori, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/191,710

(22) Filed: Nov. 13, 1998

(30) Foreign Application Priority Data

Nov. 19, 1997 (JP) .................................................... 9-333754

(51) Int. Cl.[7] .................................................... H04K 1/00
(52) U.S. Cl. .................................................... 375/147
(58) Field of Search .................................. 345/130, 149, 345/147, 355, 326; 370/342, 320, 441; 455/522

(56) References Cited

U.S. PATENT DOCUMENTS 5,881,056 * 3/1999 Huang et al. ........................ 370/335
6,067,292 * 5/2000 Huang et al. ........................ 370/342

* cited by examiner

Primary Examiner—Tesfaldet Bocure
(74) Attorney, Agent, or Firm—Pearne & Gordon LLP

(57) ABSTRACT

A rake receiver is provided with a first decimating unit for extracting received signals in order to perform synchronous acquisition, and a second decimating unit for extracting received signals from a synchronously acquired clock. A despreading unit is used to despread the received signals extracted by the second decimating unit with a PN code and also for supplying the resulting data to a time tracking unit. A second despreading unit is used to despread received signals extracted by the second decimating unit. Selectors are used for switchingly outputting a PN code and the wideband PN code to the second despreading unit. The data to be supplied to the pilot carrier tracking unit and the data path demodulating unit are despread by using the second despreading unit common to those units. The number of despreading units can thus be reduced to two.

6 Claims, 10 Drawing Sheets

RAKE RECEIVER, AND MOBILE UNIT AND BASE STATION FOR PORTABLE TELEPHONE SYSTEM AND USING THE SAME

BACKGROUND OF THE INVENTION

The present invention relates to a rake receiver which rakes reception results of multipaths, and a mobile unit and a base station for a portable telephone system which use such a rake receiver, and more particularly to a reduction of a circuit scale.

In recent years, a portable telephone of the CDMA system in which different PN (pseudo-noise) codes are allocated to users is rapidly developed. Recently, a system in which a PNW code consisting of a combination of short and long codes is used as the PN code has been studied. A short code is defined for each cell. A spread code is generated by multiplying the short code with a long code which is allocated to each user. When a short code has four chips, the chip number of a PNW code is four times that of a PN code constituting a long code.

In the case where such a code is used, even when any short code is selected in a base station, the communication channel of a cell never coincides with that of another cell.

In the CDMA system, multipaths can be separated from each other in processes of spread and despread. The reception quality can be enhanced by raking reception results of the separated paths. When a PNW code is used, chips are spread in a higher degree, and hence the performance of the rake reception is further improved.

A CDMA portable telephone which performs a rake reception has a plurality of finger circuits which perform demodulation. The finger circuits demodulate received data of different paths, and the demodulated data are raked.

In the CDMA system, furthermore, a pilot symbol is periodically inserted into a transmitted frame. On the reception side, the pilot symbol is detected so as to acquire synchronization, and the acquired synchronization is tracked.

As shown in FIG. 5, a finger circuit of a conventional CDMA portable telephone comprises: a decimating unit 40 which decimates received signals RxI and RxQ in accordance with the acquired synchronization; a despreading unit 42 which despreads OnTimeI and OnTimeQ that are decimated in the decimating unit 40, by using PNW to demodulate the received data; a data path demodulating unit 45 which receives demodulated data DataOnTimeI and DataOnTimeQ that are obtained as a result of the despread, and which decodes the data; a despreading unit 43 which despreads OnTimeI and OnTimeQ by using a long code PN and demodulates pilot data; a pilot carrier tracking unit 46 which receives pilot data PilotOnTimeI and PilotOnTimeQ that are obtained as a result of the despread, and which performs synchronous tracking; a decimating unit 41 which decimates the received signals RxI and RxQ at various timings in order to perform synchronous acquisition; a despreading unit 44 which despreads ELI and ELQ that are decimated in the decimating unit 41, by using a long code PN; and a time tracking unit 47 which acquires synchronization by using PilotELI and PilotELQ that are obtained as a result of the despread.

In the finger circuit, as shown in FIG. 10, the decimating unit 41 decimates the received signals RxI and RxQ after the timing of ELCLK, and outputs ELI and ELQ, and the despreading unit 44 despreads the PN codes of PnI and PnQ into the ELI and ELQ.

In the time tracking unit 47, when a pilot data cannot be detected from the outputs PilotELI and PilotELQ of the despreading unit 44, ELCLK is shifted by one clock. When ELCLK is sequentially shifted by one clock in this way, it is possible to acquire a synchronized clock which enables a pilot data to be detected.

When synchronous acquisition is attained, the clock is input as OnTimeCLK into the decimating unit 40, and the decimating unit 40 decimates the received signals RxI and RxQ from OnTimeCLK to output OnTimeI and OnTimeQ.

The despreading unit 42 despreads OnTimeI and OnTimeQ by using PNW codes of PnWI and PnWQ, and demodulates the received data DATaOnTimeI and DataOnTimeQ. The demodulated data are supplied to the data path demodulating unit 45.

The despreading unit 43 despreads OnTimeI and OnTimeQ with the PN codes of PnI and PnQ and demodulates pilot data PilotOnTimeI and PilotOnTimeQ. The demodulated data are supplied to the pilot carrier tracking unit 46. The pilot carrier tracking unit 46 performs synchronous tracking while adjusting OnTimeCLK supplied to the decimating unit 40, so that the pilot data can be always detected from the outputs PilotOnTimeI and PilotOnTimeQ of the despreading unit 43.

In order to enhance the performance of rake reception, it is required to increase the number of finger circuits and that of paths which are to be subjected to demodulation in the finger circuits. Each finger circuit employed in a rake receiver of the prior art has despreading units which are respectively used for a data path demodulating unit, a pilot carrier tracking unit, and a time tracking unit. As the number of finger circuits is larger, therefore, the number of despreading units is increased, thereby producing a problem in that the circuit scale of the whole of a rake receiver is extremely enlarged.

SUMMARY OF THE INVENTION

The invention has been conducted in order to solve the problem of the prior art. It is an object of the invention to provide a rake receiver in which the number of despreading units is reduced so as to suppress expansion of the circuit scale, and also to provide a mobile unit and a base station for a portable telephone system which use such a receiver.

In the rake receiver of the invention, selecting means for switching a spread code which is to be supplied to despreading means, and/or selecting means for switching received signals which are to be supplied to despreading means are disposed, whereby despreading means for supplying data to a data path demodulating unit, a pilot carrier tracking unit, and a time tracking unit can be commonly used, so that the number of the despreading means is reduced to two or one.

Consequently, the circuit scale of the rake receiver can be reduced.

When the configuration of the rake receiver is applied to a mobile unit or a base station for a portable telephone system, the circuit scale of the mobile unit or the base station can be reduced.

According to the first aspect of the present invention, a rake receiver comprises: first decimating means for extracting received signals in order to perform synchronous acquisition; and second decimating means for extracting received signals from a synchronously acquired clock, and in which the received signals extracted by the first decimating means are despread with a PN code and then supplied to time tracking means, the received signals extracted by the second decimating means are despread with a PN code, obtained pilot data are supplied to pilot carrier tracking means, the received signals extracted by the second decimating means are despread with a wideband PN code, and obtained data are supplied to data path demodulating means, and the rake receiver further comprises: despreading means for despreading the received signals extracted by the second decimating means; and selecting means for switchingly outputting the PN code and the wideband PN code to the despreading means, the data which are to be supplied to the pilot carrier tracking means and the data path demodulating means are despread by using the despreading means which is common to these means. The number of the despreading means can be reduced to two.

According to the second aspect of the present invention, a rake receiver comprises: selecting means for switchingly outputting the received signals extracted by the first decimating means and the received signals extracted by the second decimating means; and despreading means for despreading an output of the selecting means with a PN code, and the data which are to be supplied to the pilot carrier tracking means and the time tracking means are despread by using the despreading means which is common to these means. The number of the despreading means can be reduced to two.

Further, according to the third aspect of the present invention, a rake receiver comprises: selecting means for switchingly outputting the received signals extracted by the first decimating means and the received signals extracted by the second decimating means; despreading means for despreading an output of the selecting means; and selecting means for switchingly outputting the PN code and the wideband PN code to the despreading means, and the data which are to be supplied to the data path demodulating means and the time tracking means are despread by using the despreading means which is common to these means. The number of the despreading means can be reduced to two.

Furthermore, according to the fourth aspect of the present invention, a rake receiver comprises: selecting means for switchingly outputting the received signals extracted by the first decimating means and the received signals extracted by the second decimating means; despreading means for despreading an output of the selecting means; and selecting means for switchingly outputting the PN code and the wideband PN code to the despreading means, and the data which are to be supplied to the data path demodulating means, the time tracking means, and the pilot carrier tracking means are despread by using the despreading means which is common to these means. The number of the despreading means can be reduced to one.

Still further, according to the fifth aspect of the present, the configuration of the rake receiver as mentioned above is disposed in a mobile unit for a portable telephone system. The circuit scale of the mobile unit can be made smaller.

Still furthermore, according to the sixth aspect of the present invention, the configuration of the rake receiver as mentioned-above is disposed in a base station for a portable telephone system. The circuit scale of the base station can be made smaller.

DETAILED DESCRIPTION OF THE PREFERRED EMBODIMENTS

Figure 1:
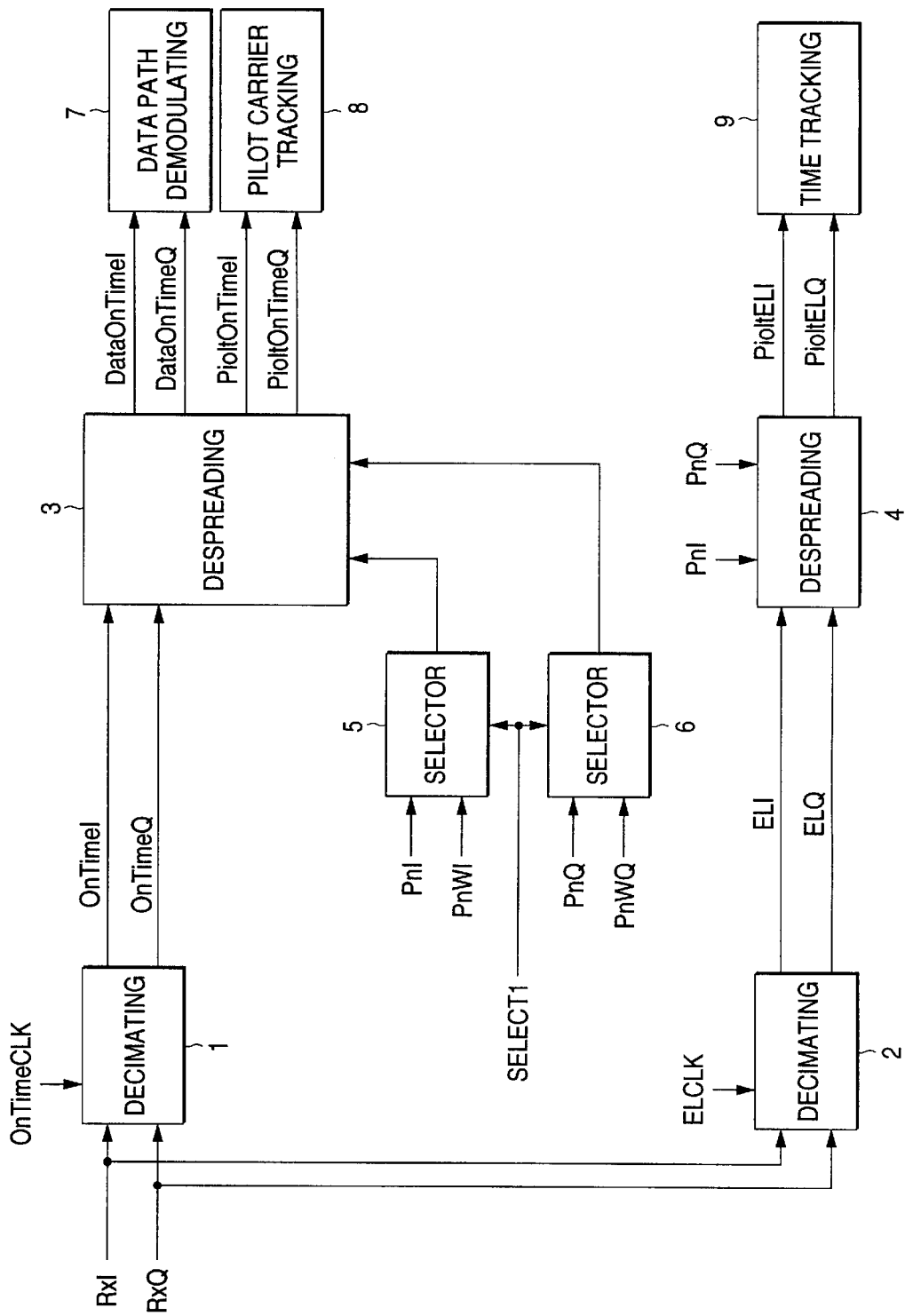
FIG. 1 is a view showing the configuration of a rake receiver of a first embodiment of the invention.

Hereinafter, embodiments of the invention will be described with reference to the accompanying drawings.
First Embodiment As shown in FIG. 1, a finger circuit of a rake receiver of a first embodiment comprises: a decimating unit 1 which decimates received signals RxI and RxQ with OnTimeCLK; a selector 5 which switchingly outputs PnI and PnWI in accordance with a selection signal Select1; a selector 6 which switchingly outputs PnQ and PnWQ in accordance with the selection signal Select1; a despreading unit 3 which despreads OnTimeI and OnTimeQ that are supplied from the decimating unit 1, by using codes that are output from the selectors 5 and 6; a data path demodulating unit 7 which receives outputs DataOnTimeI and DataOnTimeQ that are obtained when despread is performed by using PnWI and PnWQ in the despreading unit 3; a pilot carrier tracking unit 8 which receives outputs PilotOnTimeI and PilotOnTimeQ that are obtained when despread is performed by using PnI and PnQ in the despreading unit 3; a decimating unit 2 which decimates the received signals RxI and RxQ at a timing of ELCLK; a despreading unit 4 which despreads ELI and ELQ that are supplied from the decimating unit 2, by using PnI and PnQ; and a time tracking unit 9 which acquires synchronization by using PilotELI and PilotELQ that are obtained as a result of the despread.

Figure 6:
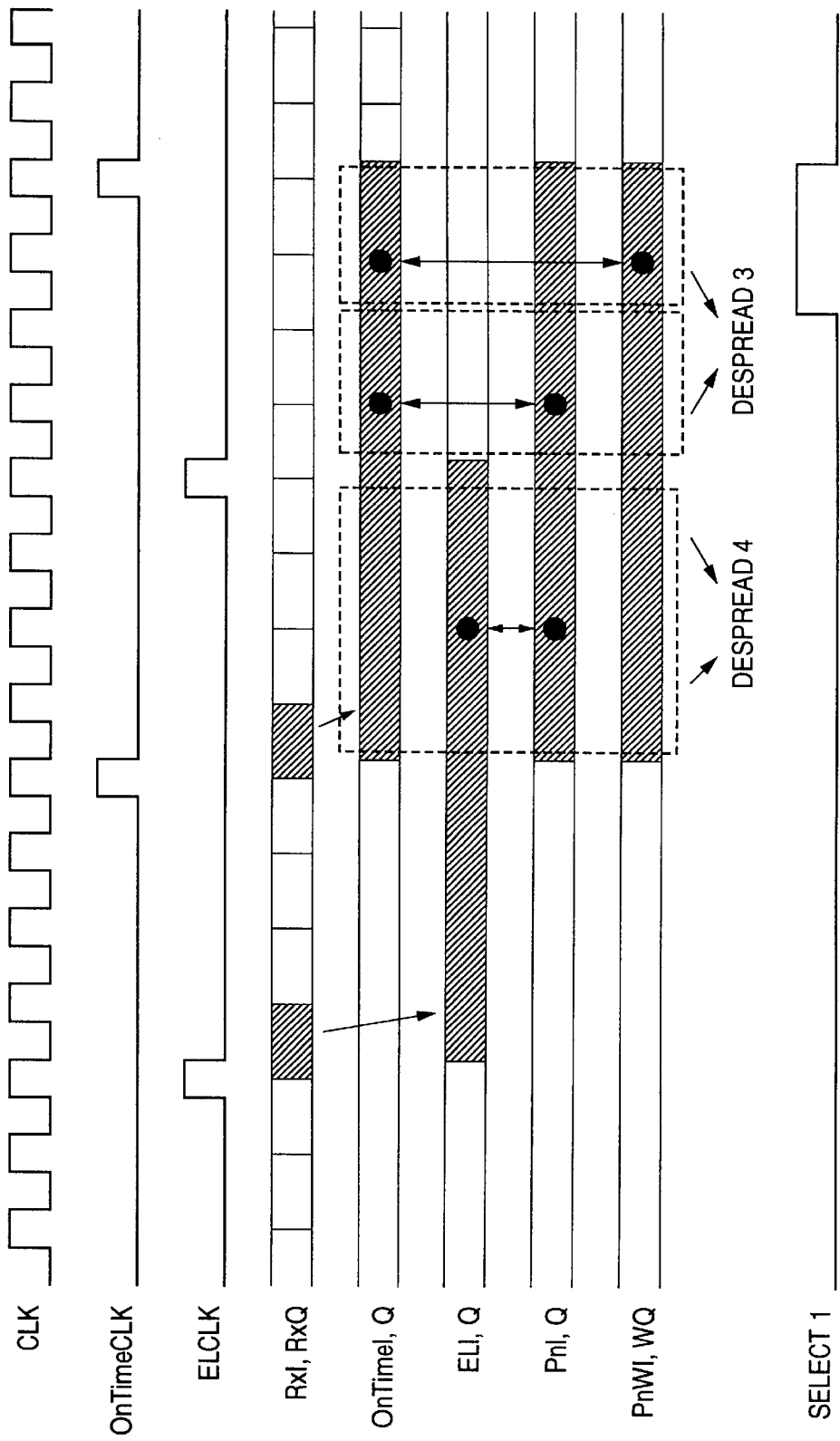
FIG. 6 is a timing chart showing the operation of the rake receiver of the first embodiment of the invention.

In the finger circuit, as shown in FIG. 6, the decimating unit 2 decimates the received signals RxI and RxQ after the timing of ELCLK, and outputs ELI and ELQ, and the despreading unit 4 despreads PnI and PnQ into the ELI and ELQ, and supplies outputs PilotELI and PilotELQ to the time tracking unit 9. The time tracking unit 9 performs synchronous acquisition on the basis of the outputs of the despreading unit 4.

The clock OnTimeCLK which is synchronously acquired is input into the decimating unit 1. The decimating unit 1 outputs the received signals OnTimeI and OnTimeQ after OnTimeCLK.

In accordance with Select1, the selectors 5 and 6 switchingly output PnI and PnWI, and PnQ and PnWQ, respectively. When the selectors 5 and 6 respectively output PnWI and PnWQ, the despreading unit 3 despreads OnTimeI and OnTimeQ supplied from the decimating unit 1, with the PnWI and PnWQ, and demodulates the received data DataOnTimeI and DataOnTimeQ. The demodulated data are supplied to the data path demodulating unit 7.

When the selectors 5 and 6 respectively output PnI and PnQ, the despreading unit 3 despreads OnTimeI and OnTimeQ supplied from the decimating unit 1, with the PnI and PnQ, and demodulates the pilot data PilotOnTimeI and PilotOnTimeQ. The demodulated data are supplied to the pilot carrier tracking unit 8. The pilot carrier tracking unit 8 performs synchronous tracking on the basis of the outputs PilotOnTimeI and PilotOnTimeQ.

As described above, the finger circuit of the rake receiver of the embodiment can perform demodulation by using the two despreading units.

Second Embodiment

Also a finger circuit of a rake receiver of a second embodiment can perform demodulation by using two despreading units.

Figure 2:
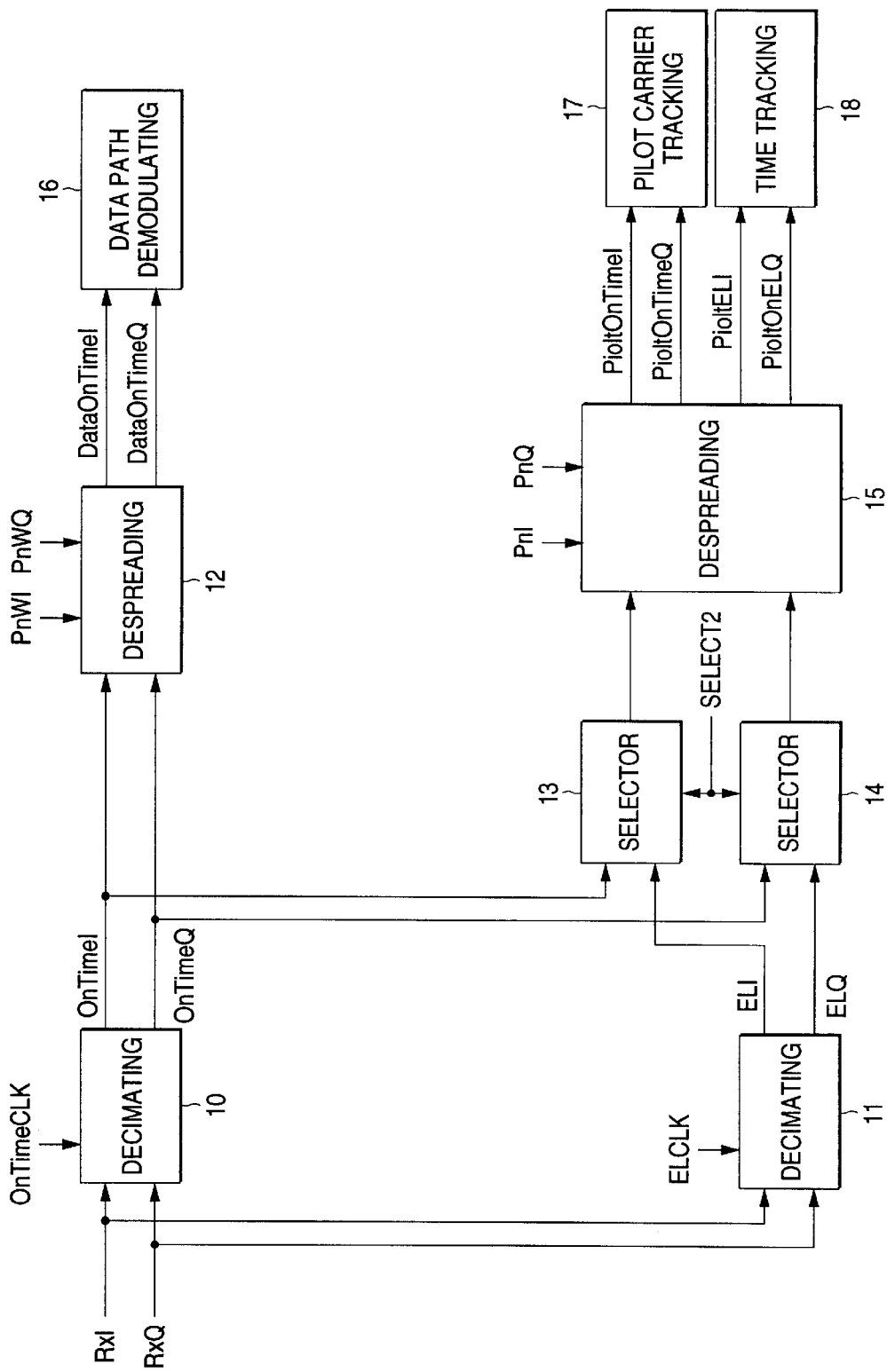
FIG. 2 is a view showing the configuration of a rake receiver of a second embodiment of the invention.

As shown in FIG. 2, the finger circuit comprises: a decimating unit 10 which decimates received signals RxI and RxQ with OnTimeCLK; a despreading unit 12 which despreads OnTimeI and OnTimeQ that are supplied from the decimating unit 10, by using PnWI and PnWQ; a data path demodulating unit 16 which receives outputs DataOnTimeI and DataOnTimeQ of the despreading unit 12; a decimating unit 11 which decimates the received signals RxI and RxQ at a timing of ELCLK; a selector 13 which switchingly outputs the output OnTimeI of the decimating unit 10 and an output ELI of the decimating unit 11 in accordance with a selection signal Select2; a selector 14 which switchingly outputs the output OnTimeQ of the decimating unit 10 and an output ELQ of the decimating unit 11 in accordance with the selection signal Select2; a despreading unit 15 which despreads outputs of the selectors 13 and 14 by using PnI and PnQ; a pilot carrier tracking unit 17 which receives outputs PilotOnTimeI and PilotOnTimeQ that are obtained when despread is performed on OnTimeI and OnTimeQ in the despreading unit 15; and a time tracking unit 18 which receives outputs PilotELI and PilotELQ that are obtained when despread is performed on ELI and ELQ in the despreading unit 15.

Figure 7:
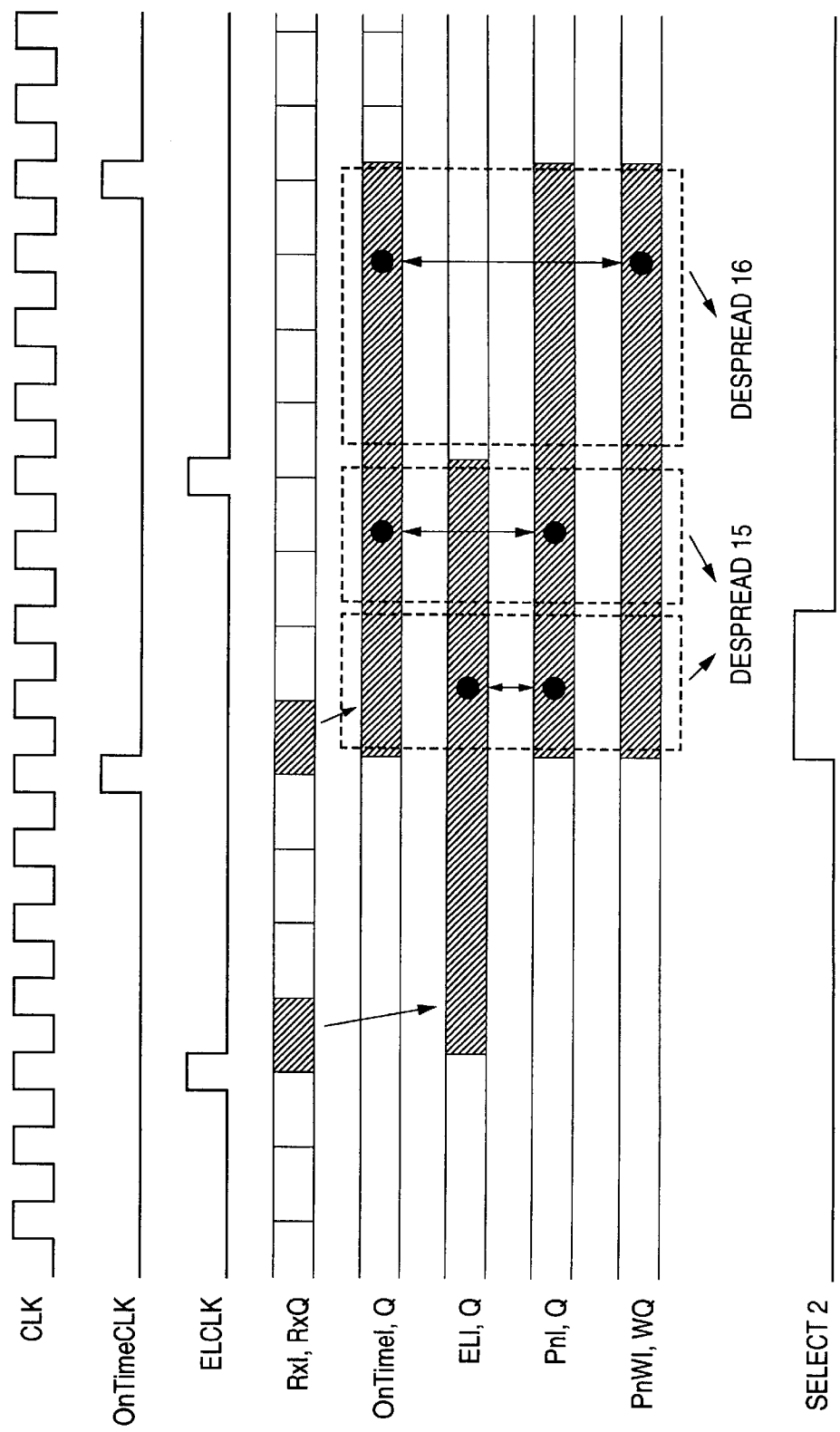
FIG. 7 is a timing chart showing the operation of the rake receiver of the second embodiment of the invention.

In the finger circuit, as shown in FIG. 7, the decimating unit 11 decimates the received signals RxI and RxQ after the timing of ELCLK, and outputs ELI and ELQ. The selectors 13 and 14 supply the outputs to the despreading unit 15 in accordance with Select2. The despreading unit 14 despreads PnI and PnQ into the ELI and ELQ, and supplies PilotELI and PilotELQ to the time tracking unit 18. The time tracking unit 18 performs synchronous acquisition on the basis of the outputs of the despreading unit 15.

The clock OnTimeCLK which is synchronously acquired is input into the decimating unit 10. The decimating unit 10 outputs the received signals OnTimeI and OnTimeQ after OnTimeCLK.

The despreading unit 12 despreads OnTimeI and OnTimeQ with PnWI and PnWQ, and demodulates the received data DataOnTimeI and DataOnTimeQ. The demodulated data are supplied to the data path demodulating unit 16.

The selectors 13 and 14 supplies OnTimeI and OnTimeQ to the despreading unit 15 in accordance with Select 2. The despreading unit 15 despreads PnI and PnQ into OnTimeI and OnTimeQ, and demodulates the pilot data PilotOnTimeI and PilotOnTimeQ. The demodulated data are supplied to the pilot carrier tracking unit 17. The pilot carrier tracking unit 17 performs synchronous tracking on the basis of the outputs PilotOnTimeI and PilotOnTimeQ.

As described above, the finger circuit of the rake receiver of the embodiment can perform demodulation by using the two despreading units.

Third Embodiment

Also a finger circuit of a rake receiver of a third embodiment can perform demodulation by using two despreading units.

Figure 3:
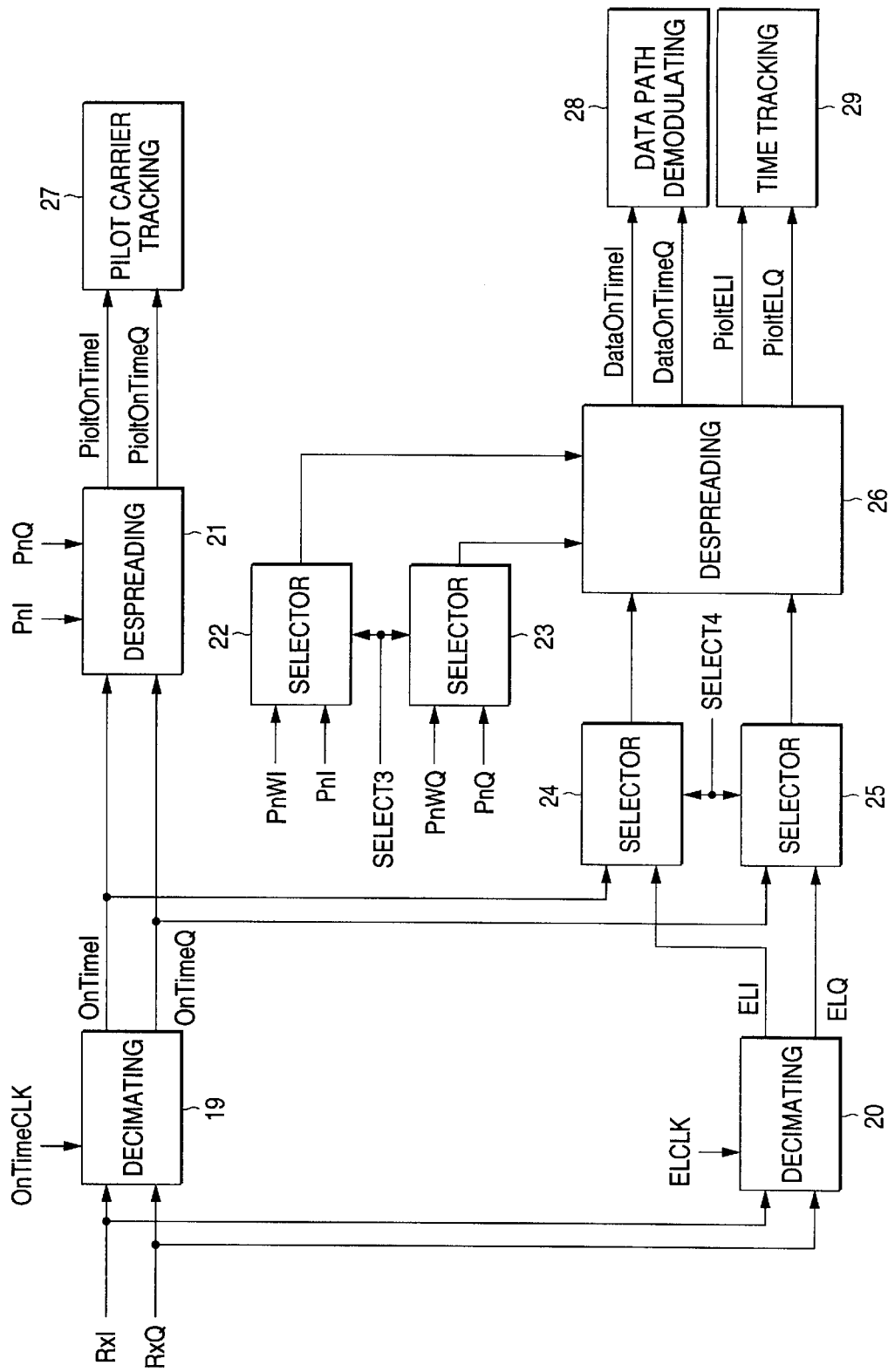
FIG. 3 is a view showing the configuration of a rake receiver of a third embodiment of the invention.

As shown in FIG. 3, the finger circuit comprises: a decimating unit 19 which decimates received signals RxI and RxQ with OnTimeCLK; a despreading unit 21 which despreads OnTimeI and OnTimeQ that are output from the decimating unit 19, by using PnI and PnQ; a pilot carrier tracking unit 27 which receives outputs PilotOnTimeI and PilotOnTimeQ of the despreading unit 21; a decimating unit 20 which decimates the received signals RxI and RxQ at a timing of ELCLK; a selector 24 which switchingly outputs the output OnTimeI of the decimating unit 19 and an output ELI of the decimating unit 20 in accordance with a selection signal Select4; a selector 25 which switchingly outputs the output OnTimeQ of the decimating unit 19 and an output ELQ of the decimating unit 20 in accordance with the selection signal Select4; a selector 22 which switchingly outputs PnI and PnWI in accordance with a selection signal Select3; a selector 23 which switchingly outputs PnQ and PnWQ in accordance with the selection signal Select3; a despreading unit 26 which despreads outputs of the selectors 24 and 25 by using the codes output from the selectors 22 and 23; a data path demodulating unit 28 which receives DataOnTimeI and DataOnTimeQ output from the despreading unit 26; and a time tracking unit 29 which receives PilotELI and PilotELQ output from the despreading unit 26.

Figure 8:
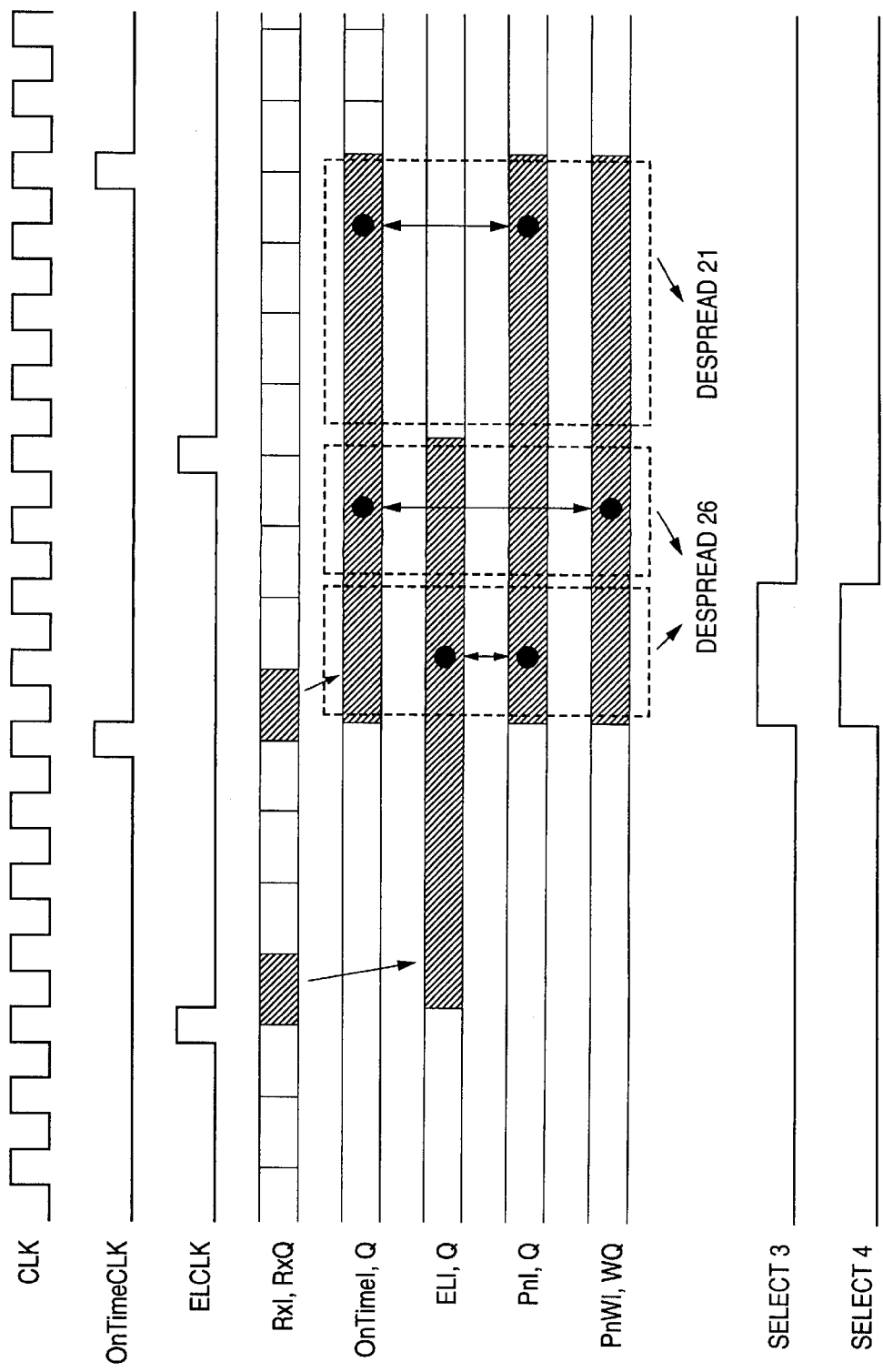
FIG. 8 is a timing chart showing the operation of the rake receiver of the third embodiment of the invention.

In the finger circuit, as shown in FIG. 8, the decimating unit 20 decimates the received signals RxI and RxQ after the timing of ELCLK, and outputs ELI and ELQ. The selectors 24 and 25 supply the outputs to the despreading unit 26 in accordance with Select4.

The selectors 22 and 23 supply PnI and PnQ to the despreading unit 26 in accordance with Select3.

The despreading unit 26 despreads PnI and PnQ into the ELI and ELQ, and supplies PilotELI and PilotELQ to the time tracking unit 29. The time tracking unit 29 performs synchronous acquisition on the basis of the outputs PilotELI and PilotELQ of the despreading unit 26.

The clock OnTimeCLK which is synchronously acquired is input into the decimating unit 19. The decimating unit 19 outputs the received signals OnTimeI and OnTimeQ after OnTimeCLK.

The despreading unit 21 despreads OnTimeI and OnTimeQ with PnI and PnQ, and demodulates the pilot data PilotOnTimeI and PilotOnTimeQ. The demodulated data are supplied to the pilot carrier tracking unit 27. The pilot carrier tracking unit 27 performs synchronous tracking on the basis of the outputs PilotOnTimeI and PilotOnTimeQ.

The selectors 24 and 25 supply OnTimeI and OnTimeQ to the despreading unit 26 in accordance with Select4, and the selectors 22 and 23 supply PnWI and PnWQ to the despreading unit 26 in accordance with Select3.

The despreading unit 26 despreads PnWI and PnWQ into OnTimeI and OnTimeQ, and demodulates the received data DataOnTimeI and DataOnTimeQ. The demodulated data are supplied to the data path demodulating unit 28.

As described above, the finger circuit of the rake receiver of the embodiment can perform demodulation by using the two despreading units.

Fourth Embodiment

A finger circuit of a rake receiver of a fourth embodiment can perform demodulation by using one despreading unit.

Figure 4:
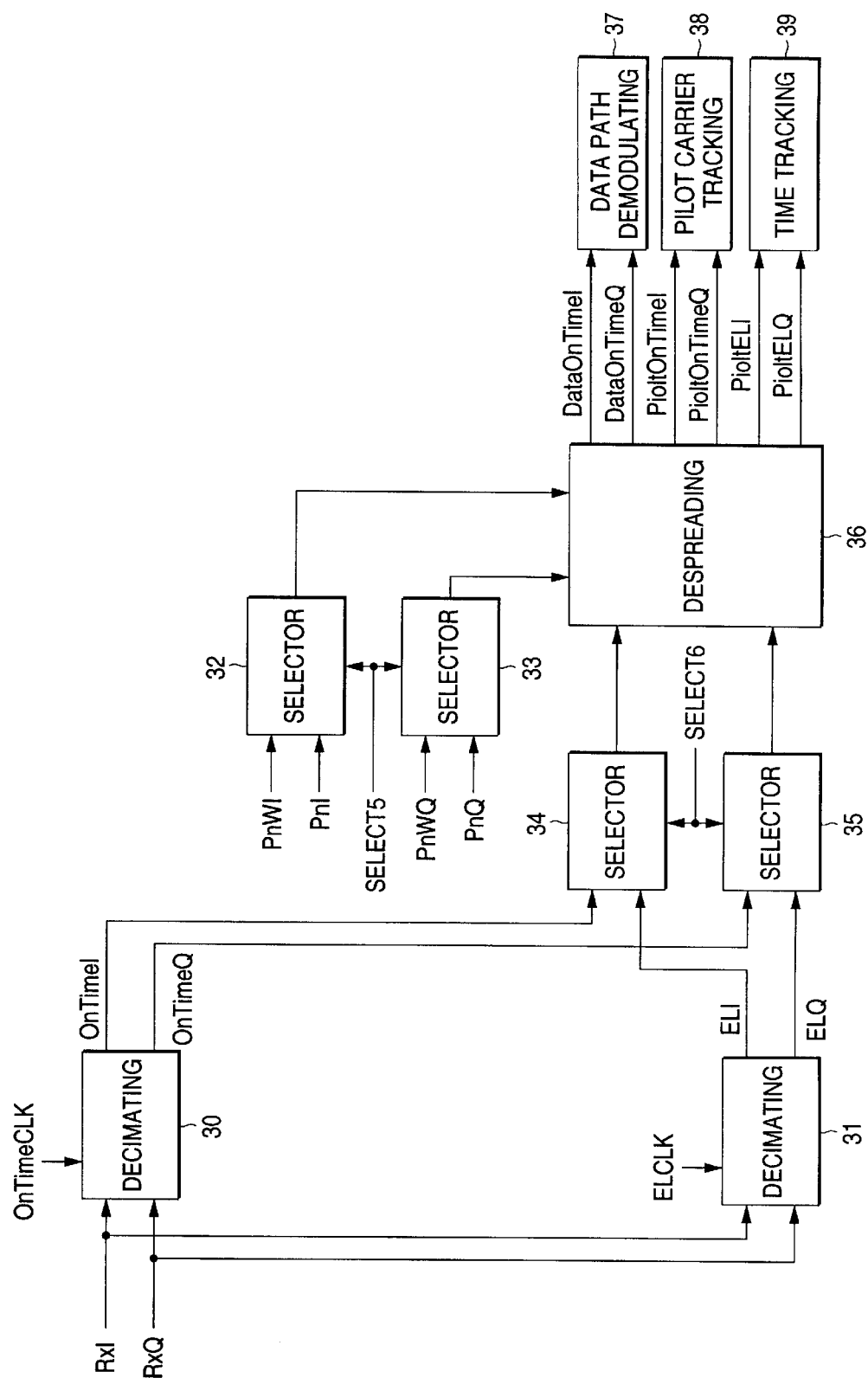
FIG. 4 is a view showing the configuration of a rake receiver of a fourth embodiment of the invention.
Figure 5:
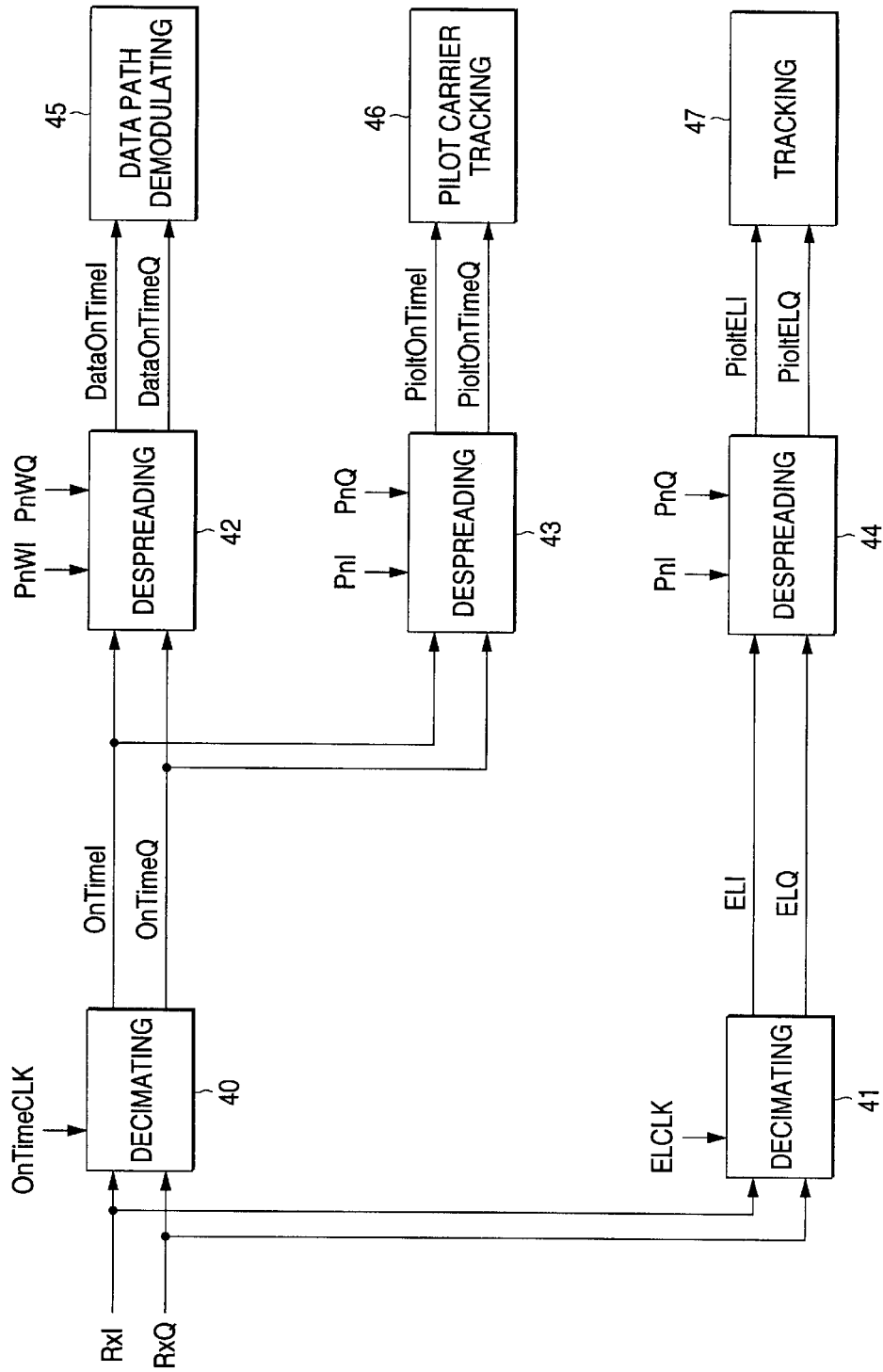
FIG. 5 is a view showing the configuration of a rake receiver of the prior art.

As shown in FIG. 4, the finger circuit comprises: a decimating unit 30 which decimates received signals RxI and RxQ with OnTimeCLK; a decimating unit 31 which decimates the received signals RxI and RxQ at a timing of ELCLK; a selector 34 which switchingly outputs the output OnTimeI of the decimating unit 30 and an output ELI of the decimating unit 31 in accordance with a selection signal Select6; a selector 35 which switchingly outputs the output OnTimeQ of the decimating unit 30 and an output ELQ of the decimating unit 31 in accordance with the selection signal Select6; a selector 32 which switchingly outputs PnI and PnWI in accordance with a selection signal Select5; a selector 33 which switchingly outputs PnQ and PnWQ in accordance with the selection signal Select5; a despreading unit 36 which despreads outputs of the selectors 34 and 35 by using codes output from the selectors 32 and 33; a data path demodulating unit 37 which receives DataOnTimeI and DataOnTimeQ output from the despreading unit 36; a pilot carrier tracking unit 38 which receives PilotOnTimeI and PilotOnTimeQ output from the despreading unit 36; and a time tracking unit 39 which receives PilotELI and PilotELQ output from the despreading unit 36.

Figure 9:
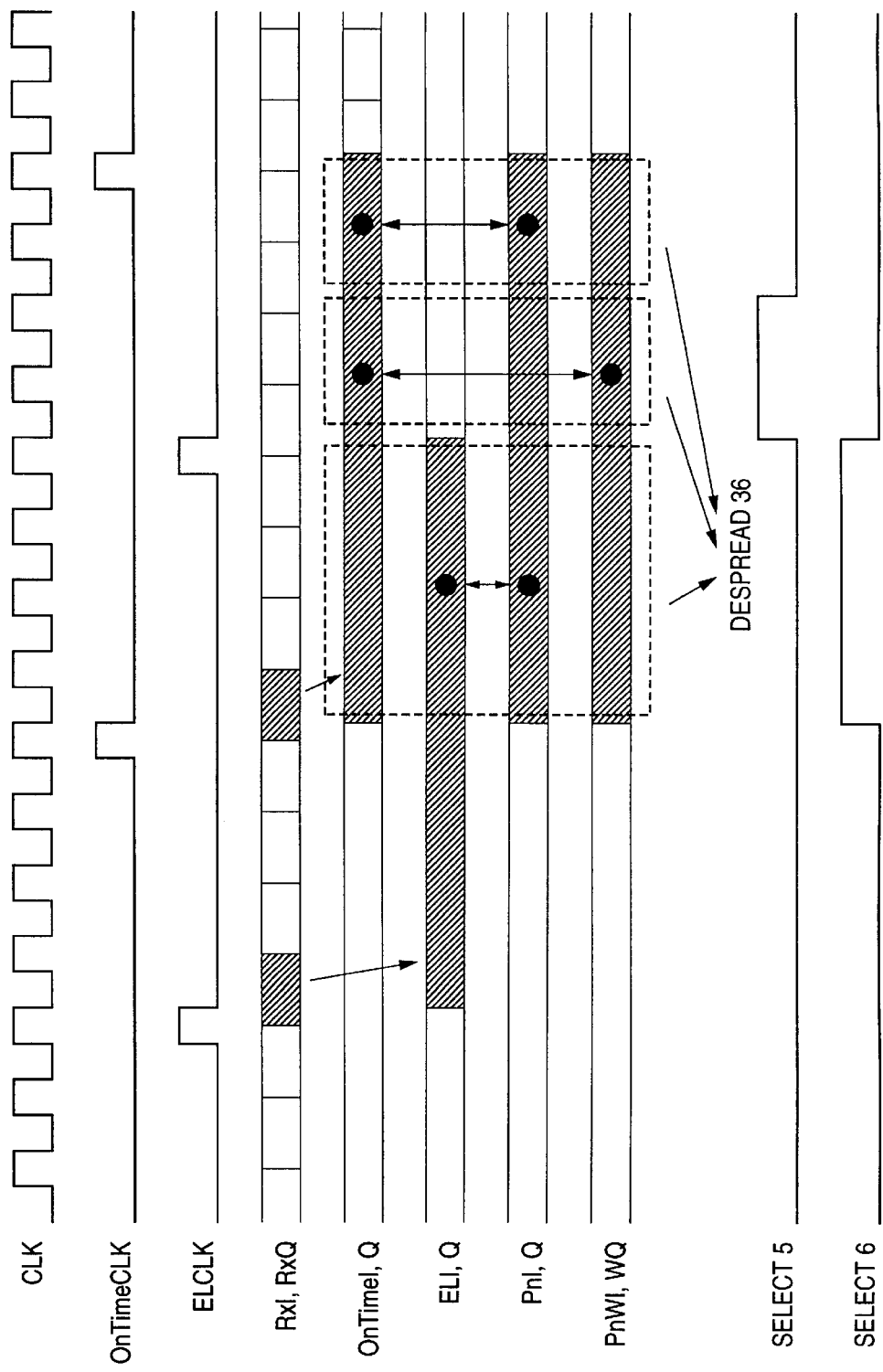
FIG. 9 is a timing chart showing the operation of the rake receiver of the fourth embodiment of the invention.
Figure 10:
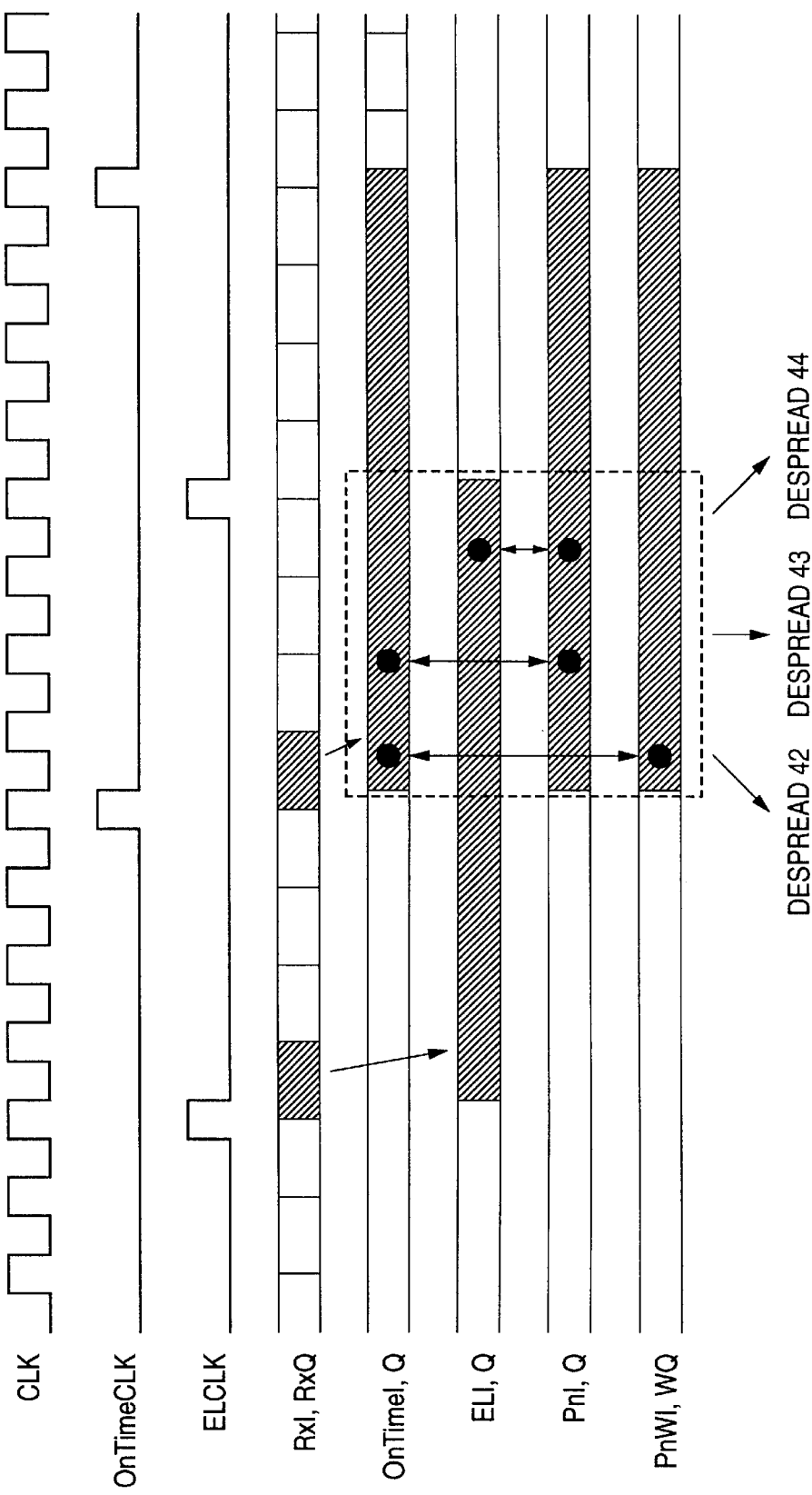
FIG. 10 is a timing chart showing the operation of the rake receiver of the prior art.

In the finger circuit, as shown in FIG. 9, the decimating unit 31 decimates the received signals RxI and RxQ after the timing of ELCLK, and outputs ELI and ELQ. The selectors 34 and 35 supply the outputs to the despreading unit 36 in accordance with Select6.

The selectors 32 and 33 supply PnI and PnQ to the despreading unit 36 in accordance with Select5.

The despreading unit 36 despreads PnI and PnQ into the ELI and ELQ, and supplies outputs PilotELI and PilotELQ to the time tracking unit 39. The time tracking unit 39 performs synchronous acquisition on the basis of the outputs PilotELI and PilotELQ.

The clock OnTimeCLK which is synchronously acquired is input into the decimating unit 30. The decimating unit 30 outputs the received signals OnTimeI and OnTimeQ after OnTimeCLK. The selectors 34 and 35 supply the outputs to the despreading unit 36 in accordance with Select6.

In accordance with Select5, the selectors 32 and 33 switchingly supply PnI and PnQ, and PnWI and PnWQ to the despreading unit 36, respectively.

When the selectors 32 and 33 respectively output PnWI and PnWQ, the despreading unit 36 despreads OnTimeI and OnTimeQ supplied from the selectors 34 and 35, with the PnWI and PnWQ, and demodulates the received data DataOnTimeI and DataOnTimeQ. The demodulated data are supplied to the data path demodulating unit 37.

When the selectors 32 and 33 respectively output PnI and PnQ, the despreading unit 36 despreads OnTimeI and OnTimeQ supplied from the selectors 34 and 35, with the PnI and PnQ, and demodulates the pilot data PilotOnTimeI and PilotOnTimeQ. The demodulated data are supplied to the pilot carrier tracking unit 38. The pilot carrier tracking unit 38 performs synchronous tracking on the basis of the outputs PilotOnTimeI and PilotOnTimeQ.

As described above, the finger circuit of the rake receiver of the embodiment can perform demodulation by using the one despreading unit.

As apparent from the above description, in the rake receiver of the invention, the number of despreading units in a finger circuit can be reduced and hence the circuit scale can be made smaller.

Furthermore, a mobile unit and a base station for a portable telephone system into which the configuration of the receiver is incorporated can be miniaturized by reducing the circuit scale.

What is claimed is:

1. A rake receiver comprising:
   first decimating means for extracting received signals in order to perform synchronous acquisition;
   second decimating means for extracting received signals from a synchronously acquired clock;
   selecting means for switchingly outputting a PN code and a wideband PN code;
   first despreading means which despreads the received signals extracted by said first decimating means with said PN code to supply them to time tracking means; and
   second despreading means for despreading an outputting of said second decimating means with an outputting of said selecting means, said second despreading means which despreads the received signals extracted by said second decimating means with said PN code to supply obtained pilot data are to pilot carrier tracking means, and which despreads the received signals extracted by said second decimating means with said wideband PN code to supply obtained data to data path demodulating means;
   wherein the data which are to be supplied to said pilot carrier tracking means and said data path demodulating means are despread by using said second despreading means which is common to these means.

2. A rake receiver comprising:
   first decimating means for extracting received signals in order to perform synchronous acquisition;
   second decimating means for extracting received signals from a synchronously acquired clock
   selecting means for switchingly outputting the received signals extracted by said first decimating means and the received signals extracted by said second decimating means;
   first despreading means for despreading an output of said selecting means with a PN code, said first despreading means which despreads the received signals extracted by said first decimating means with the PN code to supply to time tracking means, and despreads the received signals extracted by said second decimating means with the PN code to supply obtained pilot data to pilot carrier tracking means; and
   second despreading means which despreads the received signals extracted by said second decimating means with a wideband PN code to supply obtained data to data path demodulating means,
   wherein the data which are to be supplied to said pilot carrier tracking means and said time tracking means are despread by using said first despreading means which is common to these means.

3. A rake receiver comprising:
   first decimating means for extracting received signals in order to perform synchronous acquisition;
   second decimating means for extracting received signals from a synchronously acquire clock;
   first selecting means for switchingly outputting the received signals extracted by said first decimating means and the received signals extracted by second decimating means;
   second selecting means for switchingly outputting a PN code and a wideband PN code;
   first despreading means for despreading an output of said first selecting means with an output of said second selecting means, said first despreading means which despreads the received signals extracted by said first decimating means with said PN code to supply to time tracking means, and despreads the received signals extracted by said second decimating means with said wideband PN code to supply obtained data to data path demodulating means; and
   second despreading means which despreads the received signals extracted by said second decimating means with said PN code to supply obtained pilot data to pilot carrier tracking means, wherein the data which are to be supplied to said data path demodulating means and said time tracking means are despread by using said first despreading means which is common to these means.

4. A rake receiver comprising:

first decimating means for extracting received signals in order to perform synchronous acquisition;

second decimating means for extracting received signals from a synchronously acquired clock;

first selecting means for switchingly outputting the received signals extracted by said first decimating means and the received signals extracted by said second decimating means;

despreading means which despreads the received signals extracted by said first decimating means with a PN code to supply to time tracking means, despreads the received signals extracted by paid second decimating means with said PN code to supply obtained pilot data to pilot carrier tracking means, and despreads the received signals extracted by said second decimating means with a wideband PN code to supply obtained data to data path demodulating means, wherein the data which are to by supplied to said data path demodulating means, said time tracking means, and said pilot carrier tracking means are despread by using said despreading means which is common to these means;

second selecting means for switchingly outputting said PN code and said wideband PN code to said despreading means, wherein said despreading means is also for despreading an output of said second selecting means.

5. A mobile unit for a portable telephone system comprising: the rake receiver as defined in any one of claims 1 to 4.

6. A base station for a portable telephone system comprising: the rake receiver as defined in any one of claims 1 to 4.

* * * * *